July 7, 1959
F. O. CARLSON
2,893,656
RULER CONSTRUCTIONS
Filed Dec. 16, 1955
2 Sheets-Sheet 1
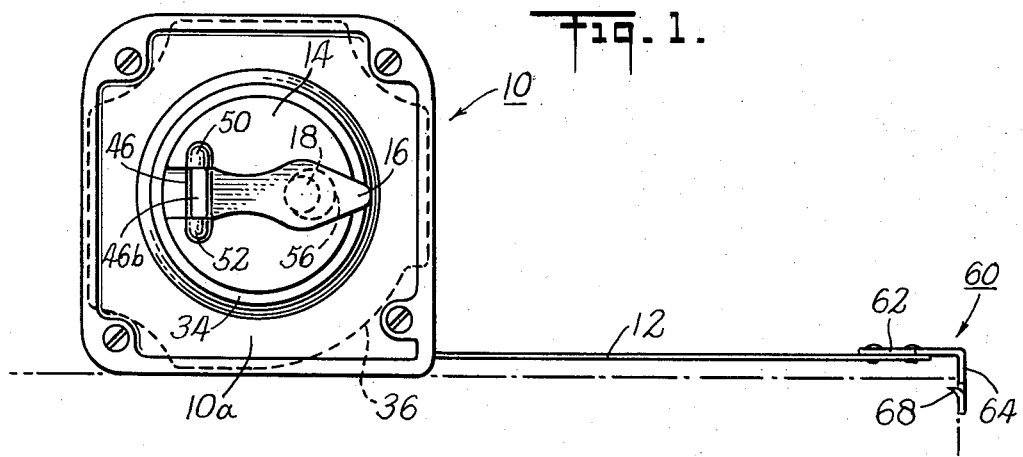
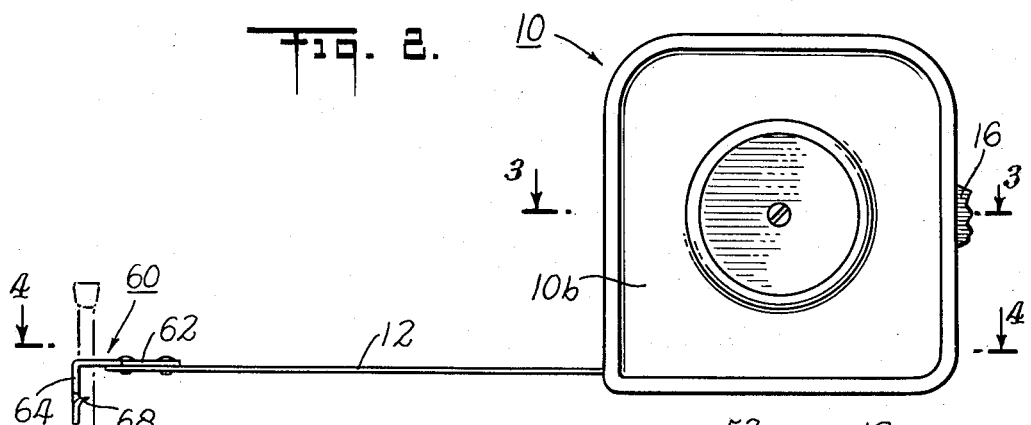
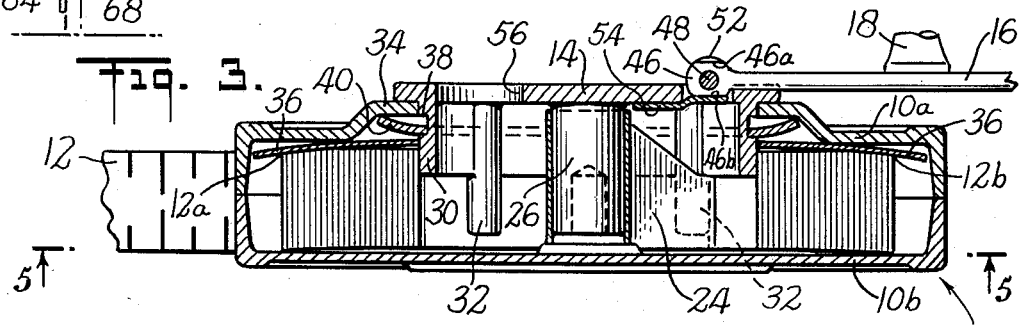
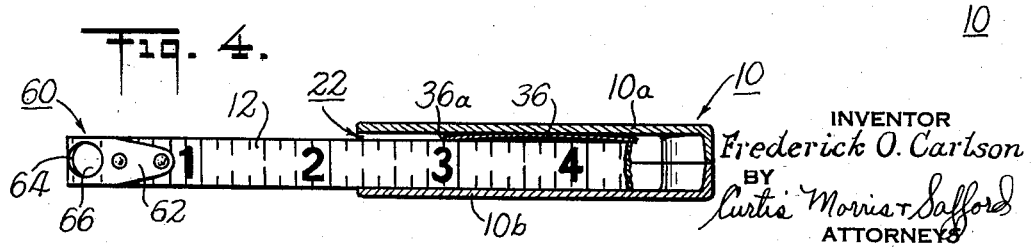
INVENTOR
Frederick O. Carlson
BY
Curtis, Morris & Safford
ATTORNEYS July 7, 1959 F. O. CARLSON 2,893,656
RULER CONSTRUCTIONS
Filed Dec. 16, 1955 2 Sheets-Sheet 2
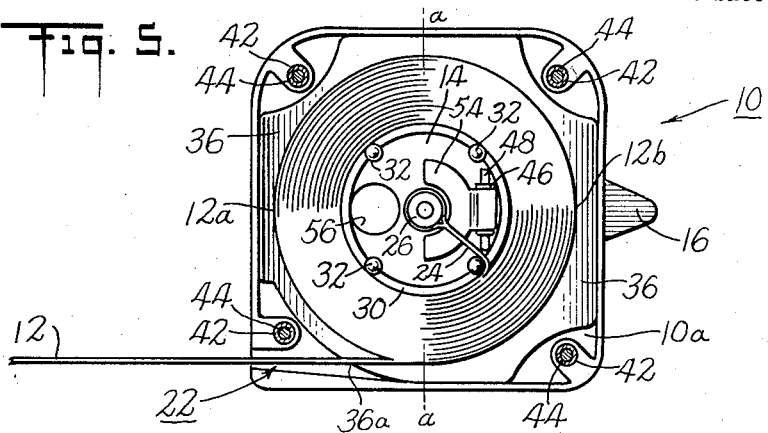
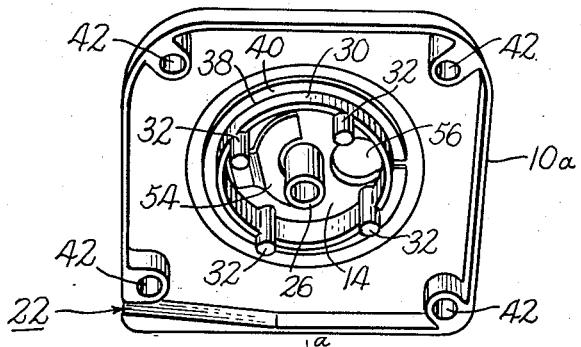
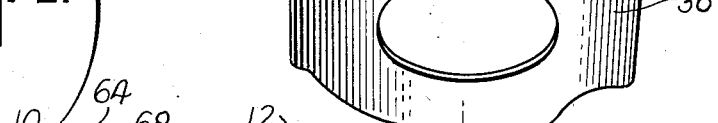
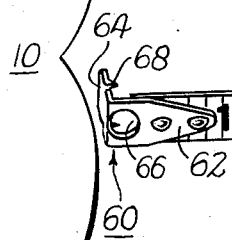
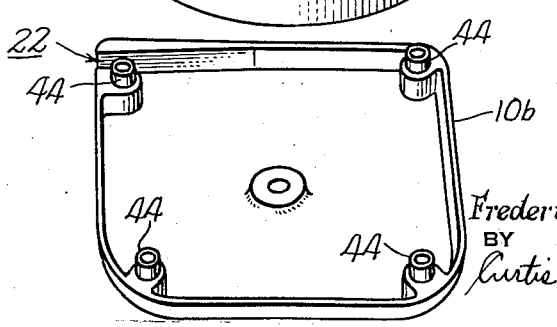
INVENTOR
*Frederick O. Carlson*
BY
*Curtis Morris & Safford*
ATTORNEYS

2,893,656

RULER CONSTRUCTIONS

Frederick O. Carlson, Arcadia, Calif., assignor, by mesne assignments, to H. K. Porter Company, Inc., of Pittsburgh, Pittsburgh, Pa., a corporation of Pennsylvania Application December 16, 1955, Serial No. 553,540

7 Claims. (Cl. 242—84.8)

This invention relates to measuring tapes comprising a blade or tape coiled in a case and to be withdrawn therefrom for use. More particularly, this invention relates to such a measuring tape having a relatively long tape that is substantially flat in cross section and which is wound on a drum rotatable within the case.

Devices of this type commonly have tapes that are 25 to 100 feet long, and are used by carpenters and other tradesmen, e.g., for layout work during building construction, etc. Although such measuring tapes have been widely available for many years, the prior devices have suffered from a number of serious defects.

One of the important problems with such measuring tapes arises from the fact that the tape when coiled on the drum forms, in effect, a wound spring, and therefore when the tape is pulled out of the case for measurement purposes there is a tendency for the tape to return to its original coiled form. The spring force thus developed by the tape coil applies a torque to the wind-up drum and also produces a force tending to pull the extended tape end back into the case. This latter "creep-back" effect has been particularly troublesome in that it was necessary either initially to pull the tape out farther than actually desired, or to manually hold the tape to prevent it from returning into the case. Also, if the tape creeps back under its own spring tension, it will tend to coil loosely in the case and after the measuring job has been completed the drum must be manually rotated a number of extra revolutions to fully retract the tape. Prior attempts to solve this problem have not produced satisfactory results.

Another difficulty with prior measuring tapes is their tendency to jam when the tape is being wound back into the case. This tendency develops when the convolutions of the coil do not exactly line up with one another during the wind-up operation, i.e., when the tape weaves back and forth along a line parallel to the drum axis. The tendency to jam particularly develops if the tape picks up small particles or thin coatings of dirt or other foreign matter during usage, since this causes each convolution to "climb up" on the preceding convolution and the twist thus imparted to the tape causes a jamming frictional force to develop.

In an attempt to alleviate jamming difficulties, makers of prior measuring tapes have generally advised purchasers to strike the side of the case against a flat surface during a wind-up operation. However, this practice has not been found to be a satisfactory solution to the problem. Also, it presents an undesirable interruption to the measuring job, and frequently there is no suitable "flat surface" nearby against which to strike the case.

The problem is especially severe with long-tape devices, because the tapes thereof frequently are dragged along the ground during usage and accordingly pick up considerable dirt and other material. Also, portions of this foreign matter frequently are shaken loose within the interior of the case, and may cause interference with the wind-up mechanism. It is therefore important to arrange the measuring tape in such a way that ready access can be had to the interior of the case for the purpose of cleaning out such foreign matter. It also is important that ready access be provided for the purpose of changing tapes, e.g., if the original tape should become damaged, and the device should be arranged to facilitate this operation.

Accordingly, it is an object of the present invention to provide a measuring tape of the type described that is superior to those provided heretofore. It is a further object of this invention to provide such a device wherein the tape when pulled out of the case will remain essentially fixed in the position to which it is extended. It is a still further object of the present invention to provide such a measuring tape wherein the wind-up operation is substantially free from jamming and excessive frictional effects.

In a preferred embodiment of the present invention, to be described hereinbelow in more detail, there is provided a measuring tape having a light-weight winding drum rotatably secured to one side wall of the casing by means of a bowed snap-ring which introduces the correct amount of frictional braking force to restrain free spinning movement of the drum and thereby prevent backlash effects. Surrounding the drum and lying adjacent the said one side wall of the casing is an arched control plate adapted to resiliently engage and apply a moderate amount of pressure to the outer convolution of the tape coil in two diametrically opposing regions. This control plate is arranged to lightly but firmly guide the tape over against the opposite side wall during the wind-up operation and thereby assure that the convolutions of the coil lie evenly each against the next. The frictional engagement between this control plate and the outer convolution of the tape coil also assures that there will be no "creep-back" of the tape after it has been extended for a measuring operation.

Furthermore, the casing and interior mechanisms are so arranged that the casing side wall opposite the rotatable drum may be removed without affecting any of these mechanisms, and the tape coil and control plate may readily be lifted out so that the inside of the case may quickly be cleaned by the user. Also, the coiled tape easily may be replaced by a new tape when desired.

Other objects, advantages and aspects of the present invention will be in part pointed out in, and in part apparent from, the following description considered together with the accompanying drawings, in which:

Figure 1 is a front elevation view of a measuring tape in accordance with the present invention, showing the rotatable hand-crank in its closed position;

Figure 2 is a rear elevation view of the measuring tape of Figure 1, with the hand-crank in its open position;

Figure 3 is an enlarged horizontal section through the tape case taken along line 3—3 of Figure 2;

Figure 4 is a horizontal section through the tape case taken along line 4—4 of Figure 2;

Figure 5 is a vertical section through the tape case taken along line 5—5 of Figure 3; and Figure 6 is an exploded interior view of the tape showing major component elements thereof.

Referring now to Figures 1 and 2, the measuring tape in accordance with the present invention comprises a relatively thin, generally D-shaped case 10, preferably a zinc casting, and from which is extensible a substantially flat steel tape 12 here shown partly withdrawn from the case. Positioned centrally of one side of the case 10, and mounted for rotary motion with respect thereto, is a circular face plate 14 to which is secured a crank 16 pivoted about one end for swinging movement away from the plane of the drawing. This crank is adapted to be swung 180° from its closed position to an open position (see Figure 3), and the crank then may be rotated manually by means of a handle 18 to turn the face plate 14 and wind the tape 12 into the case.

Referring now to Figure 5, it can be seen that the tape 12 passes into the case 10 along an inclined passageway generally indicated at 22, and is wound in the form of a tight circular coil within the interior of the case. The inner end of the tape is fastened, as by means of riveting or an upset eyelet, etc., to a flexible, tough, stainless steel strip 24, the remote end of which is curled back onto itself and spot-welded to form a loop which is fitted loosely over a cylindrical post 26 integral with and extending perpendicularly away from the face plate 14. This tape coupling arrangement is sufficiently strong that the user can, e.g., through inadvertence, wind the crank 16 in reverse without causing damage such as has occurred with prior long-tape devices.

The strip 24 extends radially outwards away from the post 26 and, along with the tape 12, is tightly wrapped about a light-weight wind-up drum formed by a shallow circular rim 30 and four upstanding rods 32 evenly spaced about the periphery of this rim. The rim and the rods are integral with the face plate 14 (see also Figure 6), and the drum formed thereby extends through a circular opening in the side wall of one casing shell 10a which is arranged to register with an opposite shell 10b to form the case 10. As best shown in Figure 3, the face plate 14 has a diameter slightly larger than that of this opening, and accordingly abuts the outer surface of the shell 10a which is raised slightly at 34 and formed with a smooth outer finish to provide a good bearing surface for rotational movement of the face plate. The shallow rim 30 engages only a narrow edge portion of the tape 12 and serves to shape the tape into circular form when it is wound into the case; the rods 32 serve to assure that this form is maintained throughout the width of the tape.

Located beneath the coiled tape 12 (see also Figures 3 and 6), and adjacent the inner surface of the shell 10a, is a control plate 36 which is centrally apertured to fit somewhat loosely about the drum rim 30. This control plate is formed of spring steel, and is provided with a gradual permanent-set bend to form a continuously-curved arch about the vertical axis $a$—$a$ of the case 10, i.e., the axis that is substantially perpendicular to the direction of movement of the tape passing through the case opening 22. The control plate defines a cylindrical surface (not necessarily a right-circular cylinder) that is curved in a first cross-sectional plane perpendicular to the vertical axis $a$—$a$, and that is substantially straight in cross-sectional planes parallel to the vertical axis $a$—$a$. The hump or back of the arch lies evenly against the inner surface of the shell 10a, while the relatively smooth inwardly facing surface of the plate engages and presses against the edge of the outer convolution of the tape coil in diametrically opposing regions thereof 12a and 12b. The pressure thereby applied to the outer convolution by the spring tension of the plate develops a frictional force which effectively restrains movement of the tape and prevents creep-back of the end of the tape that has been extended for measurement purposes.

As the tape is wound into the case, the tape edge first engages the control plate 36 (referring now to Figure 4) in a region thereof 36a spaced a short distance away from the case opening 22, and the control plate spring pressure in this region urges the tape over against the side wall of the opposite casing shell 10b. The tape is held against the side wall, as it moves farther into the case and forms into coil shape, by the pressure applied by the control plate to the opposing portions of the tape coil 12a and 12b. Thus each convolution of the tape is wound onto the drum in substantially perfect alignment with the preceding convolution, thereby eliminating any tendency of the tape to weave back and forth and jam during a wind-up operation. This freedom from jamming is obtained even when the tape has, e.g., through usage, become coated with particles or thin layers of dirt which otherwise would cause the affected tape portions to climb up on preceding convolutions and produce binding. With this control plate, there is no need as with prior rulers to strike the case against a flat surface in an attempt to avoid jamming.

In addition, the tape portion passing through the opening 22 is guided by relatively long bearing surfaces adjacent each edge thereof for substantialy the full amount of its travel to or from the circular coil. Thus there is virtually no danger that the casing will be cut by a sideways pull on the tape as often occurred with prior tape rulers due to abrasion by the sharp edge of the tape.

The control plate 36 is arched with sufficient curvature that it applies pressure to the edge of the very first convolution wrapped around the wind-up drum, i.e., before the remainder of the tape has been drawn into the case, as well as to the edge of the last convolution after the tape has been fully drawn in. And because the control plate is arched as described, the outer tape convolution also is subjected to forces directed towards the center of the drum, and the tape coil thus is prevented from expanding into a loose spiral within the case. Further, these forces are balanced and symmetrically disposed about the drum center thereby assuring that the tape is maintained in a desirably tight, evenly-wound circular coil.

The pressure applied by the control plate in the entrance region 36a thereof produces an additional advantage in that, when the tape is fully extended, this pressure urges the inner end of the tape over against the opposite casing wall so that it cannot slip into the small gap between the control plate and the drum rim 30 and thereby possibly interfere with the wind-up operation. This feature is particularly accommodated by the generally rectangular shape of the casing (e.g., D-shaped, as shown), with the tape opening located near one corner and the control plate arched about a line perpendicular to the direction of tape movement through this opening. The connecting strip 24 (see Figures 3 and 6) is narrowed in width where it passes over the rim 30, and is arranged to engage the edge of this rim to assist in preventing the first tape convolution from slipping in the gap referred to above.

Referring now to Figure 3, the drum rim 30 is formed with a small groove 38 extending completely around its outer periphery. A bowed split retaining ring 40 (see also Figure 6) is fitted into this groove and arranged so that diametrically-opposed portions of its outer edge slidably engage the inner flat surface of the raised portion 34 surrounding the circular opening in the side wall of the shell 10a. This bow given to the retaining ring (i.e., by slightly bending the ring about a diametrical axis) is such that the ring applies a small amount of pressure continuously and symmetrically between the casing wall and the rim 30.

With this arrangement, the face plate 14 is maintained in positive axial alignment with the case at all positions of the face plate, and the moderate frictional engagement serves to create a braking force which effectively eliminates backlash and spinning of the wind-up drum due to rotational inertia or to the spring force developed by the coiled tape 12. Thus, the spring force of the tape is effectively restrained at the inner tape end by the drum mounting arrangement described, and at the outer tape end by the frictional force produced by the control plate 36.

During operation of the wind-up mechanism, the retaining ring 40 may rotate with the drum or it may remain fixed with respect to the case 10. In either event, this ring provides a self-cleaning action to the bearing surfaces involved which assures continued smooth and easy operation of the wind-up mechanism even under severely adverse environmental conditions, and relatively little if any oiling is required. Further, it may be noted that the retaining ring is located in a recessed region and is effectively covered by the control plate 36 so that there is very little possibility of dirt particles getting into the bearing surfaces and disturbing operation of the mechanism. Accordingly, the braking effect provided by the split retaining ring is not subject to deterioration and provides an effective holding force even after years of normal usage.

Referring now particularly to Figure 6, the upper casing shell 10a is provided with a hole 42 in each of its four corners, and the lower shell 10b is provided in its corners with studs 44 which are arranged to fit into the corresponding holes 42 in the upper shell. Each stud is cored, so that the two shells may be held together by thread-cutting screws (not shown) inserted through the holes 42.

It will be apparent that the lower shell (Figure 6) may be removed from the upper shell without disturbing the tape coil 12, the control plate 36, or the drum mechanism secured to the upper shell. Further, the tape coil may be lifted bodily off of the drum, with the inner loop of the connecting strip 24 sliding easily from the center post 26, and the control plate may then be slipped from the drum rim 30 so that the entire interior of the case is fully accessible for cleaning purposes without the need for special tools and complex disassembly or reassembly techniques. The tape coil may, of course, readily be replaced by a new tape should it become damaged. It may also be noted (see Figure 5) that the control plate 36 is shaped so that it can only be placed in the casing in its correct position, i.e., in any other position, there will be interferences between this plate and the casing portions surrounding the screw holes 42.

Referring now to Figures 1, 3, 5 and 6, the pivoted end of the crank 16 comprises a generally tubular member 46 positioned adjacent an off-center rectangular opening in the face plate 14. This member is formed with a longitudinal bore through which extends a cylindrical shaft 48, the ends of which protrude beyond the tubular member and into the interior spaces formed by two raised sections 50 and 52 formed in the face plate 14 at opposite ends of the rectangular opening. The interior surfaces of these sections serve to prevent this shaft and the tubular member 46 from moving outwards away from the face plate.

A generally yoke-shaped leaf spring 54 is riveted to the interior surface of the face plate 14, and the rectangular end portion of this leaf spring is bent slightly so that it extends down into the rectangular opening in the face plate to hold the tubular member 46 in place. This tubular member also is formed with longitudinally extending opposing flat outer surfaces 46a and 46b which serve as detents by engaging the leaf spring 54 to hold the crank 16 in either its fully opened or its fully closed position.

When the crank 16 is moved to its closed position (as shown in Figure 1) the crank handle 18 passes through a hole 56, one edge of which is immediately adjacent the inner side wall of the rim 30. Consequently, when the measuring tape is closed up during periods of non-use, the crank handle is located within the interior space within the coiled tape 12 and out of the way.

Riveted to the outer end of the tape 12 is an end hook 60 formed of tempered tool steel. This hook is generally L-shaped, with a body 62 and a depending arm 64 perpendicular to the plane of the tape end. The body is formed with a hole 66 which can be slipped over a nail, etc., to hold the end of the tape during a "hook-on" measurement.

The arm 64 is formed with two small pointed prongs 68 extending rearwardly from the side edges thereof. When this arm is slipped over the corner of a beam or other structural element for the purpose of holding the tape end during a measurement, the prongs bite into the material and firmly lock the end hook in place. One edge of the hole 66 is exactly flush with the inner surface of the arm 64, so that the "zero" point of the tape is identical whether the end hook is held by a nail or by slipping the hook arm 64 over the edge of a structural element. This end hook arrangement also is especially strong and durable, e.g. tests have shown that it can support a weight of several hundred pounds.

This application is related to my copending application Serial No. 483,498, filed January 24, 1955, which covers features of the drum and winding mechanism, and the benefit of the filing date of said copending application is claimed herein for all common subject matter.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

I claim:

1. In a measuring tape, the combination comprising a casing adapted to be held in one hand and having an opening therein for a tape to pass through, a face plate mounted abutting one side of said casing for rotary movement, a wind-up drum within said casing having a cylindrical rim portion extending through a hole in said one side and interconnected with said face plate, a relatively long flat tape wound on said drum and having an end portion thereof extending through said casing opening, a groove formed in the outer periphery of said cylindrical rim portion, a bowed retaining ring positioned in said groove to produce a continuous pressure contact between said face plate and the said one casing side, crank means interconnected with said face plate to permit said drum to be manually rotated for winding an extended tape portion into said casing and onto said drum in the form of a circular coil, and an arched control plate fitted about the cylindrical portion of said drum and positioned between said coil and said bowed retaining ring so as to shield the ring bearing surfaces from dirt brought into said casing, said plate being arranged in such a manner that the back of its arch lies against the interior surface of said one casing side and its inwardly facing surface presses against one edge of the outer convolution of tape coiled in said casing in two diametrically-opposed regions thereof, whereby an extended tape portion is prevented from creeping back into said casing after being withdrawn therefrom and the coil convolutions are symmetrically urged into alignment with one another.

2. In a tape measure, the combination comprising a case adapted to be held in one hand and having an opening therein, a drum rotatably mounted in said case, a relatively long tape wound in a coil on said drum and having a portion thereof extending through said case opening, wind-up means interconnected with said drum for rotating said drum to draw said tape into said case, and a resilient control plate positioned in said case and disposed along one side of the tap coil wound on said drum, said control plate being curved in the form of a cylindrical surface that is arched to press against said tape coil in diametrically opposite regions thereof.

3. In a tape measure, the combination comprising a case adapted to be held in one hand and having an opening therein, a drum rotatably mounted in said case, a relatively long tape wound in a coil on said drum, said tape being formed of stiffly-flexible material and having a portion thereof extending out through said case opening, a crank interconnected with said drum for rotating said drum to draw said tape into said case, and a resilient control plate fitted about said drum to engage the tape coil wound thereon, said control plate being shaped in the form of a cylindrical surface that is curved in a first cross-sectional plane and substantially straight in a second cross-sectional plane perpendicular to said first plane, said plate being arranged to press against said tape coil in diametrically opposite regions thereof.

4. In a tape measure, the combination comprising a case adapted to be held in one hand and having an opening therein, a drum rotatably mounted in said case, a relatively long tape wound in a coil on said drum, said tape being formed of stiffly-flexible material and having a generally straight portion thereof extending through said case opening, a crank interconnected with said drum for rotating said drum to draw said tape into said case, and a resilient control plate fitted about said drum to engage one side of the tape coil wound thereon, said control plate being shaped in the form of a cylindrical surface that is curved in a first cross-sectional plane that is substantially parallel to said straight portion of said tape, said control plate being substantially straight in a second cross-sectional plane perpendicular to said first plane, said control plate being arranged to press against said tape coil in diametrically opposite regions thereof.

5. In a tape measure, the combination comprising a case having a pair of parallel spaced walls, said walls being formed with corresponding parallel straight edges along one side of said case, said case being adapted to be held in one hand having an opening extending between said walls, a drum rotatably mounted in said case, a relatively long tape wound in a coil on said drum, said tape being formed of stiffly-flexible metal and having a portion thereof extending through said case opening, said tape portion being substantially parallel to and closely adjacent said straight wall edges, a crank interconnected with said drum for rotating said drum to draw said tape into said case, and a resilient control plate fitted about said drum to engage the tape coil wound thereon, said control plate being shaped in the form of a cylindrical surface that is curved in a first cross-sectional plane parallel to said straight wall edges and substantially straight in a second cross-sectional plane perpendicular to said first plane, the convex side of said plate being seated against one of said case walls with the other side of said plate pressed against said tape coil in diametrically opposite regions thereof.

6. In a tape measure, the combination comprising a case adapted to be held in one hand and having a pair of spaced parallel walls, said walls being formed with generally rectangular shapes, said case having an opening extending between said walls, a drum rotatably mounted in said case, a relatively long tape wound in a coil on said drum, said tape being formed of stiffly-flexible material and having a portion thereof extending through said case opening, said tape portion being substantially parallel to and closely adjacent one of the edges of said case, a crank interconnected with said drum for rotating said drum to draw said tape into said case, and a resilient control plate fitted about said drum to engage the tape coil wound thereon, said control plate having the general configuration of a cross in plan view and positioned in said case with the arms of the cross parallel to corresponding edges of said rectangular case, said control plate defining a cylindrical surface that is curved in a first cross-sectional plane parallel to said one case edge and substantially straight in a second cross-sectional plane perpendicular to said first plane, two opposite arms of said plate being arranged to press against said tape coil in diametrically opposite regions thereof.

7. In a tape measure, the combination comprising a case including a pair of walls, said case being adapted to be held in one hand and having an opening therein, a drum rotatably mounted in said case entirely by bearing surfaces on one wall thereof, a relatively long tape wound in a coil on said drum and having a portion thereof extending through said case opening, wind-up means interconnected with said drum for rotating said drum to draw said tape into said case, and a resilient control plate disposed about said drum and positioned between said drum and said bearing surfaces on said one case wall to shield said bearing surfaces from dirt brought into said case, said control plate being curved in the form of a cylindrical surface that is arched to press against said tape coil in diametrically opposite regions thereof.

References Cited in the file of this patent

UNITED STATES PATENTS

| | | |
|---|---|---|
| 992,170 | Crane | May 16, 1911 |
| 1,006,056 | Bowers | Oct. 17, 1911 |
| 1,102,436 | Richardson | July 7, 1914 |
| 1,939,546 | Farrand | Dec. 12, 1933 |
| 2,001,780 | Fry | May 21, 1935 |
| 2,005,405 | Wittel | June 18, 1935 |
| 2,055,281 | Duczewski | Sept. 22, 1936 |
| 2,268,178 | Boisture | Dec. 30, 1941 |
| 2,449,406 | Mortimer | Sept. 14, 1948 |
| 2,614,769 | Nicholson | Oct. 21, 1952 |

UNITED STATES PATENT OFFICE

CERTIFICATE OF CORRECTION

Patent No. 2,893,656                                          July 7, 1959

Frederick C. Carlson

It is hereby certified that error appears in the printed specification of the above numbered patent requiring correction and that the said Letters Patent should read as corrected below.

Column 7, line 24, for "hand having" read -- hand and having --.

Signed and sealed this 15th day of December 1959.

(SEAL)
Attest:

KARL H. AXLINE
Attesting Officer

ROBERT C. WATSON
Commissioner of Patents